US008754940B2

(12) United States Patent
Belsarkar et al.

(10) Patent No.: US 8,754,940 B2
(45) Date of Patent: Jun. 17, 2014

(54) METHOD AND APPARATUS FOR MONITORING USING A MOVABLE VIDEO DEVICE

(75) Inventors: Ajit Belsarkar, Lancaster, PA (US); David N. Katz, Hummelstown, PA (US)

(73) Assignee: Robert Bosch GmbH, Stuttgart (DE)

( * ) Notice: Subject to any disclaimer, the term of this patent is extended or adjusted under 35 U.S.C. 154(b) by 836 days.

(21) Appl. No.: 12/363,091

(22) Filed: Jan. 30, 2009

(65) Prior Publication Data

US 2010/0194882 A1 Aug. 5, 2010

(51) Int. Cl.
*H04N 7/18* (2006.01)

(52) U.S. Cl.
USPC .......... 348/143; 348/61

(58) Field of Classification Search
USPC .......... 348/143, 61
See application file for complete search history.

(56) References Cited

U.S. PATENT DOCUMENTS

| | | | | |
|---|---|---|---|---|
| 5,119,203 | A * | 6/1992 | Hosaka et al. | 348/375 |
| 5,875,305 | A | 2/1999 | Winter et al. | |
| 6,816,073 | B2 | 11/2004 | Vaccaro et al. | |
| 6,930,599 | B2 | 8/2005 | Naidoo et al. | |
| 7,103,152 | B2 | 9/2006 | Naidoo et al. | |
| 7,187,279 | B2 | 3/2007 | Chung | |
| 7,228,429 | B2 | 6/2007 | Monroe | |
| 2004/0100563 | A1 | 5/2004 | Sablak et al. | |
| 2005/0103506 | A1 | 5/2005 | Warrack et al. | |
| 2007/0050165 | A1 * | 3/2007 | Gray et al. | 702/108 |
| 2008/0036860 | A1 * | 2/2008 | Addy | 348/143 |
| 2008/0309760 | A1 * | 12/2008 | Joyner et al. | 348/143 |

FOREIGN PATENT DOCUMENTS

| | | | |
|---|---|---|---|
| EP | 1566781 | A1 | 8/2005 |
| GB | 2 433 173 | | 6/2007 |

OTHER PUBLICATIONS

IVMD 1.0 Intelligent Video Motion Detection from Bosch Security Systems brochure, Dec. 1, 2009.
Verint Video Intelligence Solutions from Verint Systems Inc. brochure, 2010.
ExitSentry for Aviation from Cernium Corporation brochure, 2007.
Perceptrak from Cernium Corporation brochure, 2010.

* cited by examiner

*Primary Examiner* — Umar Cheema
(74) *Attorney, Agent, or Firm* — Maginot, Moore & Beck

(57) ABSTRACT

Methods, devices, and systems for monitoring using a movable video device. The video device is movable to a plurality of positions definable by three dimensions. In an example method, the video device is moved to one of the plurality of positions. Within the video device, video data is acquired at the one of the plurality of positions. Further, within the video device, the acquired video data is processed using a processing algorithm that is configured according to a predetermined profile associated with the one of the plurality of positions. The result of the processing is sent to an external receiving device.

33 Claims, 15 Drawing Sheets

80

METHOD AND APPARATUS FOR MONITORING USING A MOVABLE VIDEO DEVICE

FIELD OF THE INVENTION

The present invention relates generally to the field of image processing. Embodiments of the invention relate more particularly to the fields of video processing, motion detection, and security systems and methods.

BACKGROUND OF THE INVENTION

Security for buildings and other locations often involves the use of mounted video devices, such as but not limited to video cameras. Such video devices, which may be fixed or movable, obtain a series of images of one or more scenes. These images are processed, either manually (e.g., where a human monitor reviews the obtained images) and/or at least partially automatically by image processors (e.g., computers or other processing devices) to analyze the obtained images according to particular algorithms and to catalogue and/or act on the result. When automated, intelligent image processing is used at least in part, such processing can be made more efficient and consistent.

One example use of mounted video devices with at least partial automatic image processing is task-based intelligent motion detection (IMD). IMD methods process incoming images provided by the mounted video devices to determine whether sufficient motion is present in certain locations within a scene. The sensitivity, or threshold determined amount of change between images to determine that motion has occurred, typically can be selected for individual locations within a scene. As a nonlimiting example, one or more locations within a scene can be selected (e.g., marked as a sensitive area) to detect motion. This is useful to mask out areas within a scene having inherent motion (as just one example, trees).

Within IMD generally, several types of motion detection are possible. Nonlimiting examples of IMD functionality include loitering persons detection, removed objects detection, idle objects detection, objects within range detection, objects moving against the flow detection, and tamper detection. For example, with loitering persons detection, an image processor may be configured to detect whether a person remains within a scene for a particular amount of time.

Current IMD techniques are provided generally in two settings. One conventional IMD setting is in the form of software residing on a computer (e.g., PC) linked to a video device via a network. The computer, executing the software, processes the video received from the mounted video devices.

A second setting for IMD is an embedded solution within a fixed video device, wherein one or more processors within the fixed video device itself are configured for processing images using one or more types of IMD functionality. By embedding the processors within the fixed video device itself, the fixed video device can view a scene and produce a series of images, process the images according to IMD, and even take certain actions without the requirement of being on a network. Such integrated IMD solutions also allow video devices to provide a modular security solution by being incorporated into a network and passing along video and results of IMD for further processing and/or action.

Movable video devices, such as mounted video cameras, on the other hand, currently present problems for image processing and object detection. One example movable mounted camera, a PTZ (pan-tilt-zoom) camera, moves in 3D space.

The three dimensions of the PTZ camera are defined by pan, tilt, and zoom, respectively. A set of pan, tilt, and zoom positions defines an overall position.

The present inventors have recognized that the users of such movable video devices also have a need for intelligent motion detection techniques such as (but not limited to) loitering persons detection, object removal detection, etc., which reside in the camera itself, to provide benefits such as (but not limited to) those provided by incorporating IMD image processing in a fixed camera. However, currently no solution to such need exists.

SUMMARY OF THE INVENTION

According to embodiments of the present invention, methods, devices, and systems are provided for monitoring using a movable video device. The video device is movable to a plurality of positions definable by three dimensions. In an example method, the video device is moved to one of the plurality of positions. Within the video device, video data is acquired at the one of the plurality of positions. Further, within the video device, the acquired video data is processed using a processing algorithm that is configured according to a predetermined profile associated with the one of the plurality of positions. The result of the processing is sent to an external receiving device.

DETAILED DESCRIPTION

Figure 1:
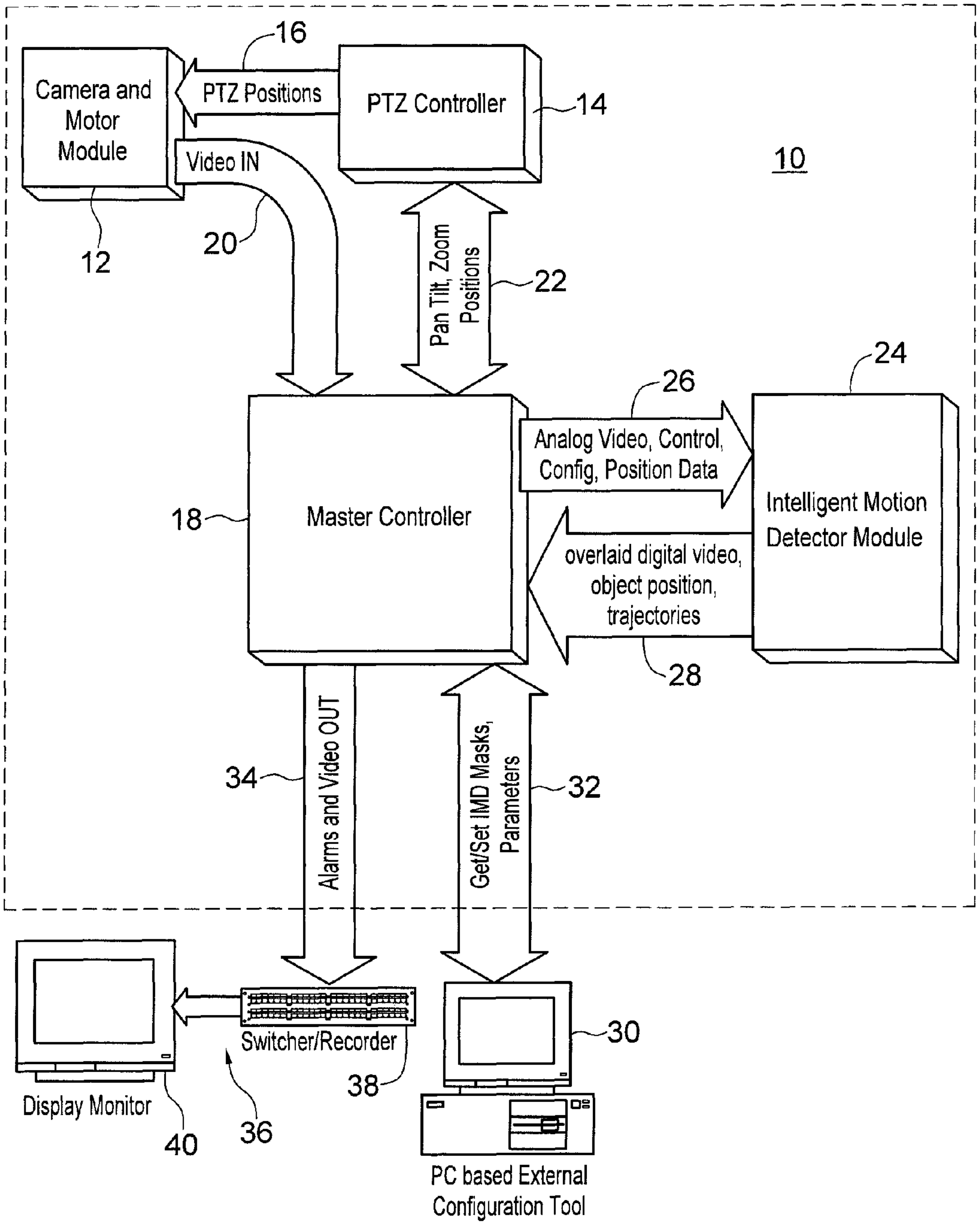
FIG. 1 shows an example embedded movable camera system, according to an embodiment of the present invention.

Embodiments of the present invention provide, among other things, methods and apparatus for image processing using a movable video device. In an example method, a movable video device moves to a particular position in space, which may be defined by a value along at least one dimension. As a nonlimiting example, for a pan, tilt, and zoom camera, a position may be defined by one pan, one tilt, and one zoom value. The position is associated with a predetermined profile including video data processing functionality. A profile, as used herein, refers to one or more data processing configuration settings, such as algorithms for monitoring at this position and/or one or more parameters for performing such algorithms. Example algorithms include, but are not limited to simple motion detection, task-based intelligent motion detection (IMD), and optical flow techniques. Example parameters include, but are not limited to, title, settings such as masks, height, width, direction, etc., and other parameters such as “too dark”, “too bright”, “too noisy”, etc.

The profile may be associated directly with the position, or indirectly, such as by associating the profile with a scene. A scene, as used herein, is a configuration entity defined at least by a unique position (preferably along three dimensions, but it may be along at least one dimension) along with other possible characteristics such as (but not limited to) focus mode (e.g., auto or manual), focus position, iris position, maximum gain, backlight compensation value, title, etc.

Profiles may be edited. Preferably, in doing so, all of the characteristics in the profile that can be associated with the scene (e.g., monitoring algorithms, sensitivity values, etc.) can be edited. However, editing a profile can be done in example embodiments without altering the definition of the scene. For example, monitoring algorithms, parameters, and other profile characteristics can be disassociated with a scene, transferred to another scene as a profile, etc. In other words, a preferred profile can exist independently of a position or scene, and can be freely altered, associated, and disassociated with any position or scene. By contrast, in certain conventional monitoring systems, a limited number of scenes may be fixedly defined as motion detection scenes, having fixed characteristics. Any region of interest in this conventional case cannot be edited, removed, or associated, and requires an overwriting of an entire scene to make changes.

Thus, a movable video device moves to a position in space (e.g., 3D space), as a scene, to an arbitrary position, etc., and the movable video device, while stationary at that position can perform monitoring according to an associated profile. A predefined profile or a default profile may be used for arbitrary positions.

The movable video device acquires video data, and the video data is processed according to the predetermined profile. A nonlimiting example of video data processing functionality includes a monitoring algorithm that processes the acquired video data to monitor one or more scenes.

In an example method, both the acquiring of video data and the video data processing take place within the movable video device. Both the video data and the results of the video data processing may then be sent to an external receiving device. “External” as used herein generally refers to a device separate from (though it may be linked) and physically outside of the movable video device. In a nonlimiting example, the video data and the results of the video data processing may be sent to the external receiving device directly and/or over a network. The external receiving device may process the video data and the results of the video data processing in any way known or to be known by those of ordinary skill in the art. It is also contemplated that certain video data processing may take place within the movable video device while other video data processing may take place by the external receiving device. However, it is preferred that sufficient video data processing capabilities be provided within the movable video device to allow intelligent motion detection in a scene according to an associated profile.

An external configuring device, such as but not limited to a computing device, may be used to associate the position with the predetermined profile. The external configuring device and the external receiving device may be the same device or a different device, and these may be single devices or multiple devices coupled in any suitable manner. An example external configuring device is embodied in a computing device linked to the movable video device in any appropriate manner (either locally or over a network, including but not limited to LAN, WAN, and the Internet). Such a computing device may include suitable input and output devices and software tools for allowing a person to configure the video data processing, including associating a monitoring profile with a scene.

Further, in example embodiments, the video data processing may result in taking one or more actions according to an image processing algorithm. Nonlimiting examples of such actions include the triggering of an alarm or an alarm condition, sending a notification to an external device, activating a predefined monitoring function, or others. In example embodiments, one or more of such actions may be taken (including making a decision to take such action) within the movable video device itself, without processing by an external device. Examples of such internally-provided actions include operating a relay, tracking motion, and others.

Preferred embodiments will now be discussed with respect to the drawings. The drawings include schematic figures that may not be to scale, which will be fully understood by skilled artisans with reference to the accompanying description. Features may be exaggerated for purposes of illustration. From the preferred embodiments, artisans will recognize additional features and broader aspects of the invention. Though example embodiments of the present invention are described herein as applied to PTZ cameras, embodiments of the invention are generally applicable to any movable video device (in one or more dimensions) capable of acquiring video data and processing video data. Further, embodiments of the invention pertain to methods for operating movable video devices, methods for analyzing video from a movable video device, as well as movable video devices, processors for movable video devices, and/or software (or hardware or firmware) for configuring a movable video device or processor for a movable video device to perform methods of the present invention.

FIG. 1 shows an example embedded camera system 10 for a movable video device. The example camera system 10 in FIG. 1 is embodied in a PTZ camera. A camera and motor module 12 includes a movable video device, which may be an analog or digital video source, e.g., a video camera configured to acquire video data, such as a series of images, and suitable motors, such as but not limited to pan, and tilt motors for a PTZ camera. A nonlimiting example PTZ camera is an AUTODOME® camera with PTZ, manufactured by Bosch Security Systems. In the example system shown in FIG. 1, the camera and motor module 12 acquires analog video (though it is also contemplated that digital video could be acquired). The camera is movable in space by a series of motors. In an example embodiment, the PTZ camera 10 is movable in pan, tilt, and zoom directions. The PTZ camera 10 is thus able to view images at a plurality of locations or points in three-dimensional (3D) space. A PTZ controller 14, which is coupled to the camera and motor module 12, selectively controls the motors in the camera and motor module to move the camera along the pan, tilt, and zoom directions to particular positions 16. The PTZ controller 14 may be embodied in a suitable hardware controller within the camera 10, and the present invention is not to be limited to a particular type of PTZ controller, or other movable video device controller. Configuration and operation of the PTZ controller and motors to position the camera will be understood by those of ordinary skill in the art, and thus a detailed description of such configuration and operation will be omitted.

The positions 16 sent to the PTZ controller 14 for moving the PTZ camera are provided by a master controller 18, which may be, as a nonlimiting example, a processor embedded in hardware of the camera. A "processor" is any suitable device, configured by software, hardware, firmware, machine readable media, propagated signal, etc., to perform steps of methods of the present invention. A processor as used herein may be one or more individual processors. Example firmware language is C++. Generally, the master controller 18 handles and communicates video data processing configuration data, processes and communicates any alarms generated, and controls the video data processing operation based on PTZ position and any settings.

At a particular position, the camera and motor module 12 acquires video data, e.g., generates a series of images, and delivers the video data to the master controller via any suitable link 20 (wired, wireless, network, analog or digital, electrical or optical, etc.) The images may be generated in any manner by the camera and motor module 12. In addition, the master controller 18 receives position information 22, such as the pan, tilt, and zoom (PTZ) values for the camera in 3D space, from the PTZ controller 14.

For providing automated scene monitoring, an intelligent motion detector (IMD) module 24 is provided, which may be the same processor as or a separate processor from the master controller 18. The IMD module 24 processes acquired video data supplied from the master controller 18, using control information, configuration information, and position data 26 supplied by the master controller 18. The IMD module 24 outputs processing results 28 to the master controller 18. Nonlimiting examples of processing results include overlaid digital video, object position, and trajectories. Additionally, the IMD module 24 and/or the master controller 18 may include metadata, such as but not limited to alarm information, object characteristics, etc.

The video data processing (e.g., motion detection) algorithms run by the IMD module 24 may be based at least in part on configurations provided by an external configuration device 30, such as but not limited to a computing device. In the example system 10 shown in FIG. 1, the external configuration device 30 communicates with the master controller 18 via a link 32 (wired, wireless, network, Internet, etc.) to get or set video data processing configuration information, such as but not limited to IMD masks and parameters.

The master controller 18 preferably outputs video data 34 and alarms or alarm data to an external receiving device 36 for display and/or further processing. As a nonlimiting example, the master controller 18 may be coupled to a switcher/recorder 38 for recording the acquired video data and forwarding the video data to an external monitor 40 for viewing. An example switcher/recorder 38 is a network device that processes alarms from the master controller 18, records video from the video data 34, and displays the video on the monitor 40 or a different monitor.

Additionally, based on the results of the IMD module 24, the master controller 18 may perform one or several actions. For example, an alarm signal may be sent from the master controller 18 to the external receiving device 36. The particular output from the master controller 18 may vary, and the present invention is not to be limited to a particular action or set of actions. However, it is preferred that, in addition to outputting acquired video data 34, the embedded camera system 10 output a result of processing acquired video data, such as but not limited to passing metadata information to allow the external device 36 to take an action. Nonlimiting example actions include beginning recording, displaying trajectories, etc. Alternatively or additionally, the master controller 18 may take an action based on such processing (such as, but not limited to, outputting an alarm indicator based on processing by the IMD module 24).

According to embodiments of the present invention, the video data processing performed by the PTZ camera 10, and preferably the video data processing performed by the IMD module, functions according to a profile (that is, a set of data processing configuration settings) that is associated with at least one position of the PTZ camera within space. For example, PTZ cameras have a unique coordinate for each point in the 3D space. P (pan), T (tilt), Z (zoom) coordinates for each point are measured with respect to a reference point. A set of coordinates provides a position in 3D space, which can also provide a scene. This scene or position is associated with a profile in example embodiments of the present invention.

PTZ cameras allow a user to store and recall scenes. A scene can be saved at any point in the 3D coordinate space, and each scene may have unique characteristics such as associated scene title, PTZ position, Automatic Gain Control (AGC), backlight compensation (BLC), maximum gain value (Max Gain), focus mode (automatic or manual), position, region of interest (ROI) number, etc. When a scene is recalled, generally using a predefined keyboard command, the camera recalls saved above parameters, thus taking it to the uniquely defined position. This allows the user to define areas and parameters of interest and go to them quickly. Scenes pointing to areas of interest such as windows, doors, etc. are commonly used. Several cameras allow features such as configuration and playback of scene tours. With this feature, the camera moves to each configured scene delaying by specified time. This allows the user to automate the monitoring of areas of interest.

Figure 2:
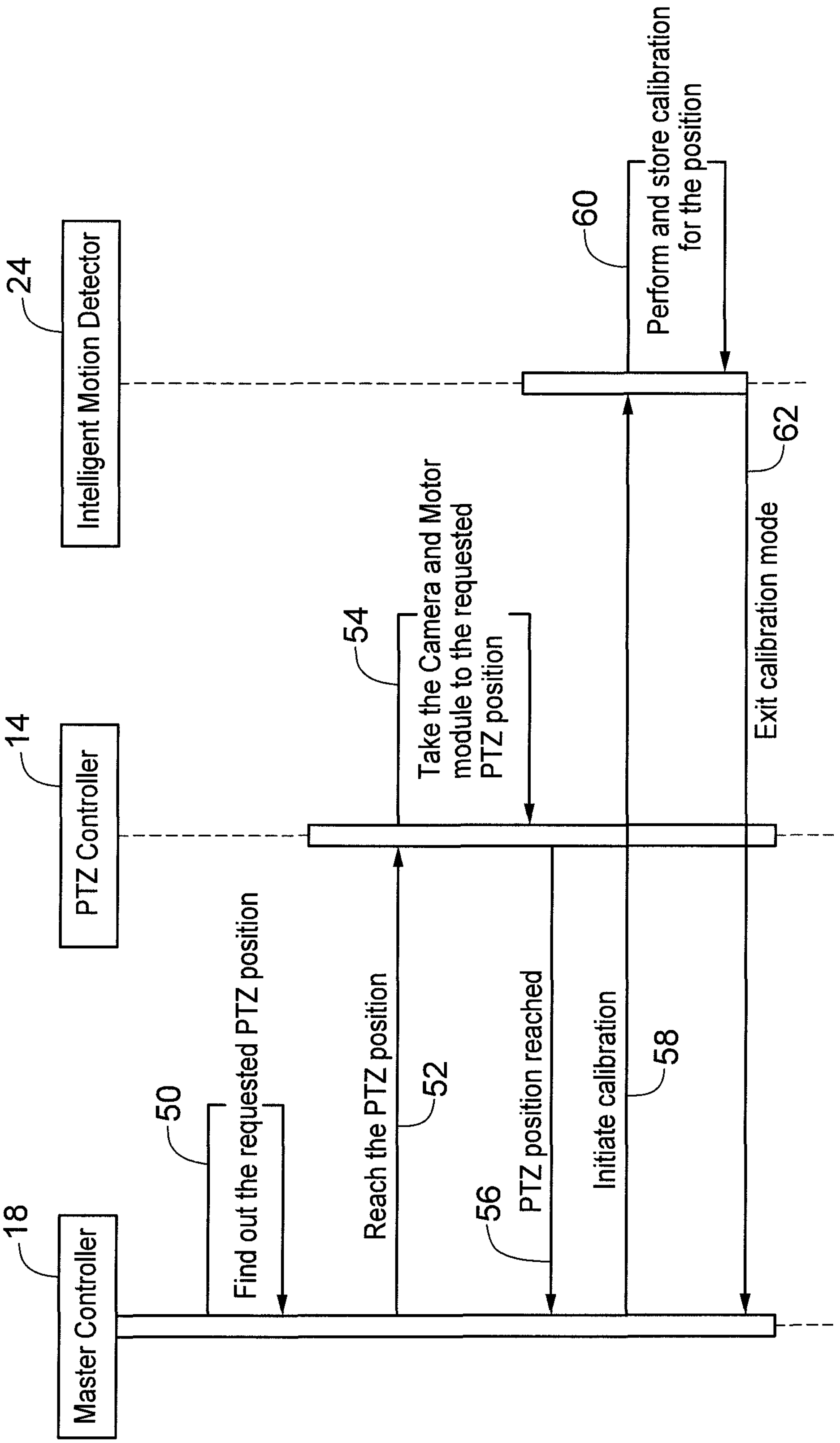
FIG. 2 shows an example sequence diagram for configuring video data processing in a movable camera, according to an embodiment of the present invention.

FIG. 2 shows an example sequence diagram for configuring video data processing such as intelligent motion detection (IMD) in a PTZ camera. As shown in FIG. 2, the master controller 18 elicits a requested PTZ position 50, which may be determined via a scene recall (e.g., by a user or system inputting a scene number or other scene identification), a scene reached while the camera 10 is on tour (e.g., where the PTZ camera moves to each of a plurality of scenes, delayed by specified time, wherein the positions and time are either standard or configurable), or by a random PTZ location selected by the user, where the user wants to configure the IMD camera. A user may select a PTZ position via the external configuration device 30, using any suitable input method, device, and/or software. Nonlimiting example input methods/devices include a joystick, keypad to enter coordinates, or other inputs. The external configuration device 30 may be directly connected to the master controller or may be linked to the master controller 18 via network. In the latter case, an interface such as a Web browser may be used to associate the scene with a particular profile and to configure the profile.

The master controller 18 takes the PTZ camera to a unique PTZ position 52 by providing a position to the PTZ controller 14. The PTZ controller 14 in turn controls the motors in the camera and motor module 12 to take the PTZ camera and motor module to the requested PTZ position 54. Once the requested PTZ position is reached 56, a calibration procedure may be initialized 58 by the master controller 18 and the IMD module 24. For example, the master controller 18 can provide calibration information, and calibration according to the calibration information can be performed for the PTZ position 60, such as by storing the calibration information (or processing the calibration information and storing the processed calibration information) in the IMD module 24.

In an example embodiment, calibration information is provided at least in part by the external configuration device 30 via the master controller 18. For example, a PC based configuration device allows a user to create or modify a profile by configuring different settings and masks related to IMD functionality. A profile may provide, as nonlimiting examples, a unique configuration including settings for the display of metadata such as object boundaries, trajectories, etc. In a nonlimiting example embodiment, a user is able to choose a certain number of scenes (for example, between 1 and 64, though more than 64 scenes are also contemplated) to be scenes during which video data processing is performed, and can configure the video data processing at any time. Each profile may be given a name via the user interface 30 or automatically, and this profile may be recalled by a user to recall settings, etc.

In a nonlimiting example embodiment, for each of a plurality of scenes, a user may select from among a number of options for associating a particular video data processing configuration with the position or scene. Example options include OFF (no video data processing), a more general motion detection, and an automated intelligent video data processing, such as IMD, configured as needed. An example of more general motion detection is a computationally inexpensive motion searching algorithm (simple motion detection), which may also be used as a default if a particular scene is not associated with another profile. Such simple motion detection can be used to search for motion within recordings if another profile has not been selected. If an existing video data processing configuration for a particular position or scene is changed, an example system may include logical rules for determining how the various configuration changes are reconciled. Preferably, profiles may be modified, copied, saved, disassociated from a particular scene or position (that is, made or altered independently of a scene or position), or deleted. While the particular position/scene is being configured, the PTZ camera 10 may be locked into its position until the configuration is completed or after a particular amount of time.

Once accepted, the profile is saved for this unique PTZ position by the IMD module 24. In this way, the PTZ position is associated with a profile for video data processing (and vice versa). After calibration, the camera system 10 exits calibration mode 62. The camera system 10 may then resume normal functionality. In a nonlimiting example embodiment, the configured video data processing may be fully functional within a short period of time (e.g., 3 seconds, though this time may vary) after activation by the user. This allows the user to use video data processing at scenes while on tour.

Figure 3:
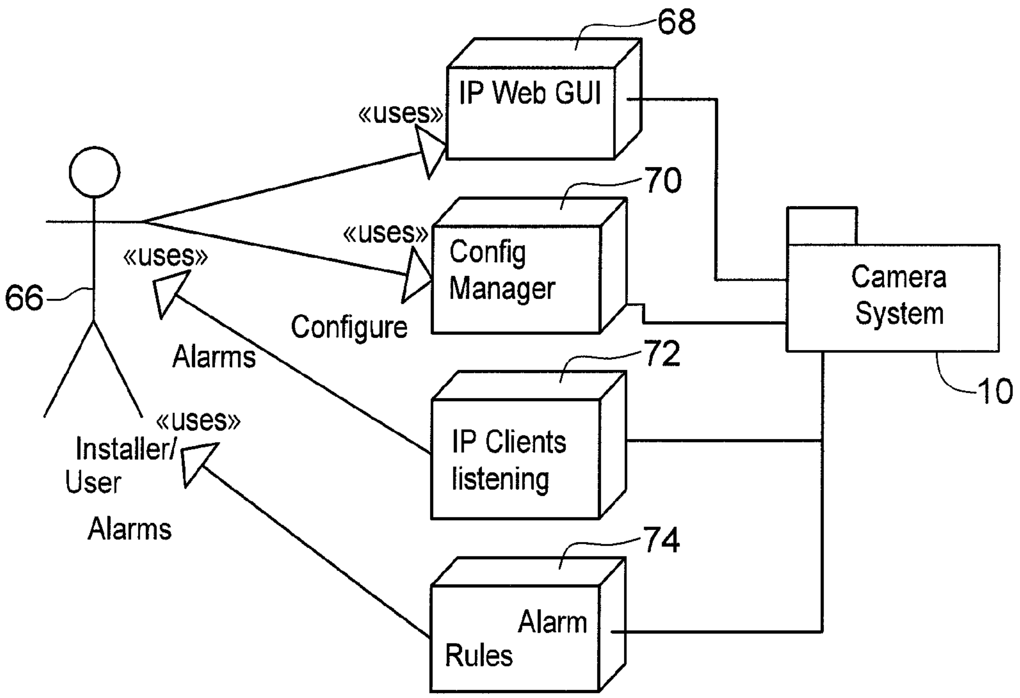
FIG. 3 shows example information flow between an embedded camera system and a user.

FIG. 3 shows an example information flow between a user and the camera system for configuring the video data processing. A user 66, such as but not limited to an installer, an Internet user who runs a remote control protocol (RCP) or RCP plus (RCP+) client that receives and processes or views alarms, and a video recording user who records and monitors recorded video for alarm events, accesses the camera system 10 via either an internet protocol (IP) Web graphical user interface (GUI) 68 or a configuration manager 70. Thus, a nonlimiting example external configuration device 30 may be embodied in a personal computer running a configuration manager, a personal computer running a Web browser including a WebGUI, and/or IP enabled devices, such as IP enabled devices that can run RCP+ protocol. Video data processing configurations can reside in an IP module, which allows a user to download and restore video data processing configuration data to and from offline configuration files. The camera system 10 may integrate with external software including, but not limited to, the configuration manager 70, an MPEG ActiveX control and video SDK, IP clients with RCP plus interface 72, alarm modules 74, and/or an archive player (not shown) for offline processing of recorded video.

Figure 4:
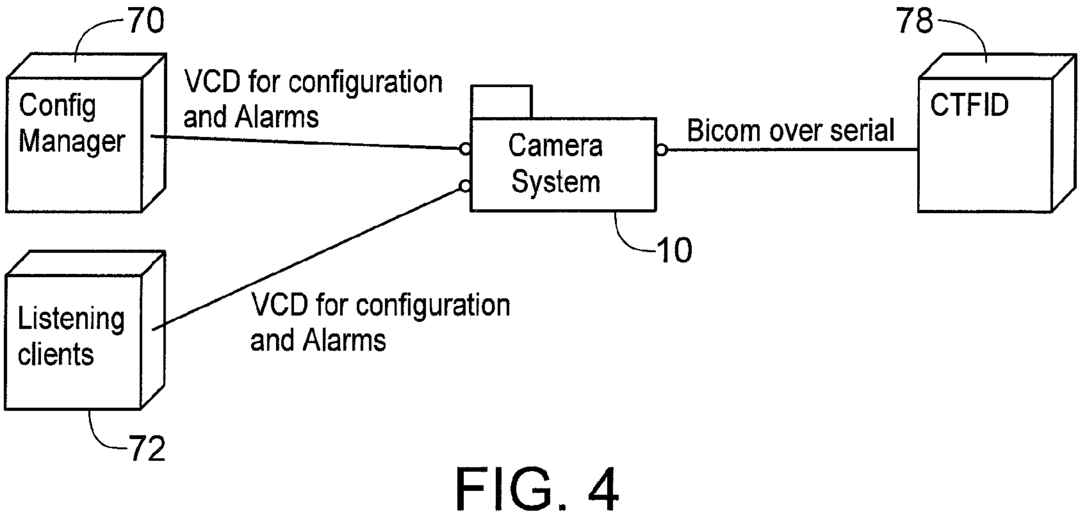
FIG. 4 shows example software interfaces for an example embedded camera system.

FIG. 4 shows example external software interfaces (either direct or indirect) for the camera system 10. The configuration manager 70 allows configuration of the video data processing in the camera system 10, such as the configuration of the IMD. A nonlimiting example data format for configuring the video data processing is video content description (VCD) data format. IP clients 72, e.g., existing RCP+ clients; can use the IP Web GUI 68 to configure the video data processing and receive motion detection alarms transmitted over IP. Other interfaces, such as Configuration Tool for Imaging Devices (CTFID) 78, may not be able to configure the video data processing, though they may be able to receive alarm events received from alarm rules.

IP clients 72 (e.g., running TCP/IP network protocol) and/or configuration managers 70 for movable video cameras may be modified according to example embodiments of the present invention to perform methods of the present invention by extending the interface to allow configuration of video data processing for one or more scenes. It is also contemplated that video data processing results, such as but not limited to trajectories, object boundaries, alarm status, etc. may be provided in the IP clients 72 and/or configuration manager 70. Suitable connections to external devices 30 include Ethernet, serial (e.g., serial via bicom), and others. Thus, embodiments of the invention may also be provided in a software plug-in that modifies an existing interface to allow configuration of video data processing by associating such processing with a movable camera position or scene.

Figure 5:
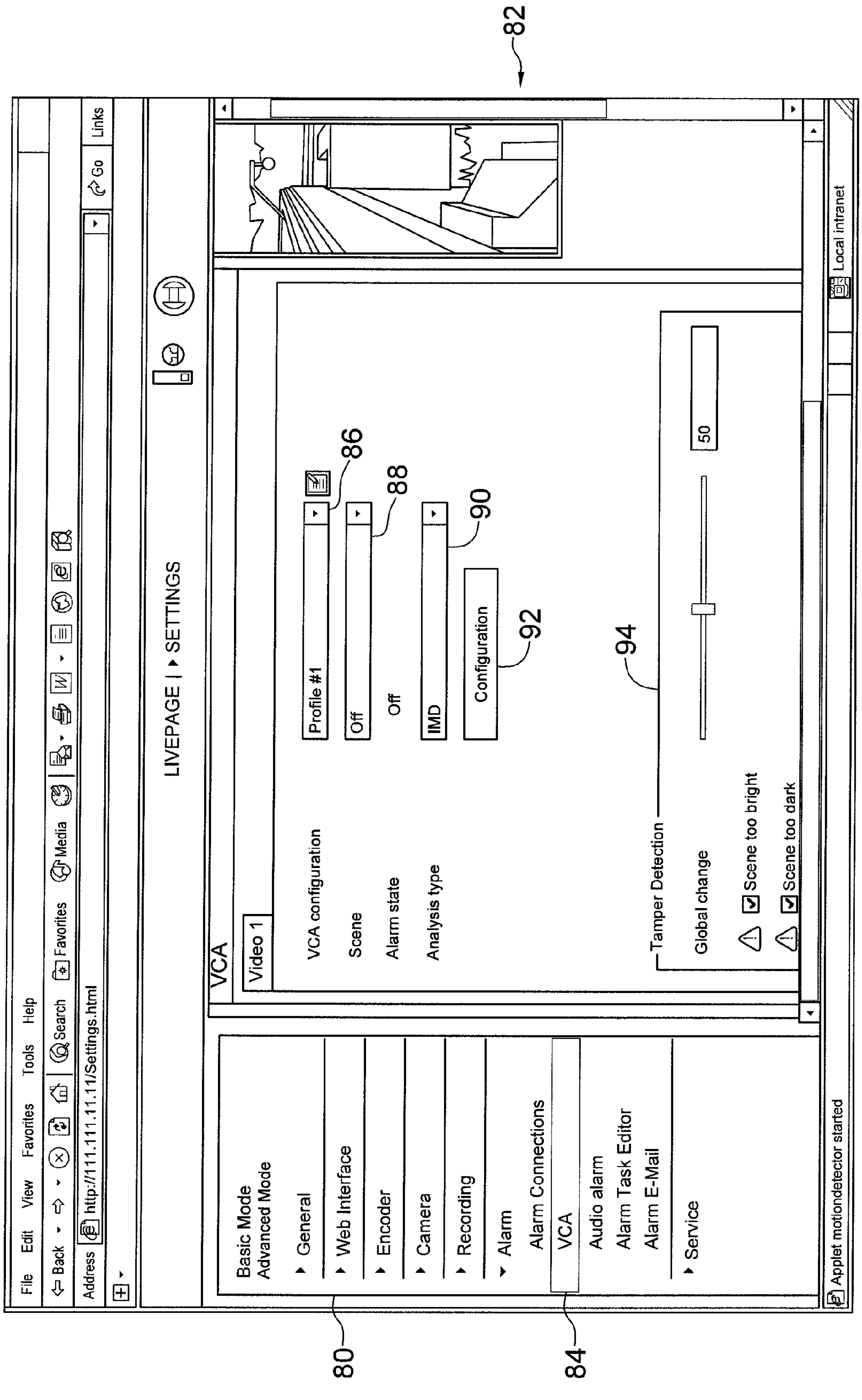
FIG. 5 shows an example Web page for accessing a camera system and associating a profile with a scene, according to an embodiment of the present invention.

FIG. 5 shows an example Web page interface 68 for accessing the camera system and configuring video data processing including motion detection. In a pane 80 of a configuration page 82 (e.g., by accessing a hierarchical menu such as Settings-Alarms), "VCA" (video content analysis) 84 is selected, which accesses a page containing a number of tools for configuring video data processing. In the configuration shown in FIG. 5, VCA configuration profile #1 is selected via a drop-down menu 86, and the scene selected is "off" 88, so that the profile selected is inactive (an example default choice). A user may then select a scene number. A general video data analysis type ("IMD") 90 is selected, and a clickable button 92 for configuring the profile is provided. Global changes for tamper detection 94 are enabled by tools on the configuration page as well. Not shown in FIG. 5, but provided on the configuration page 82, are buttons for saving the configuration after selections are made.

Figure 6:
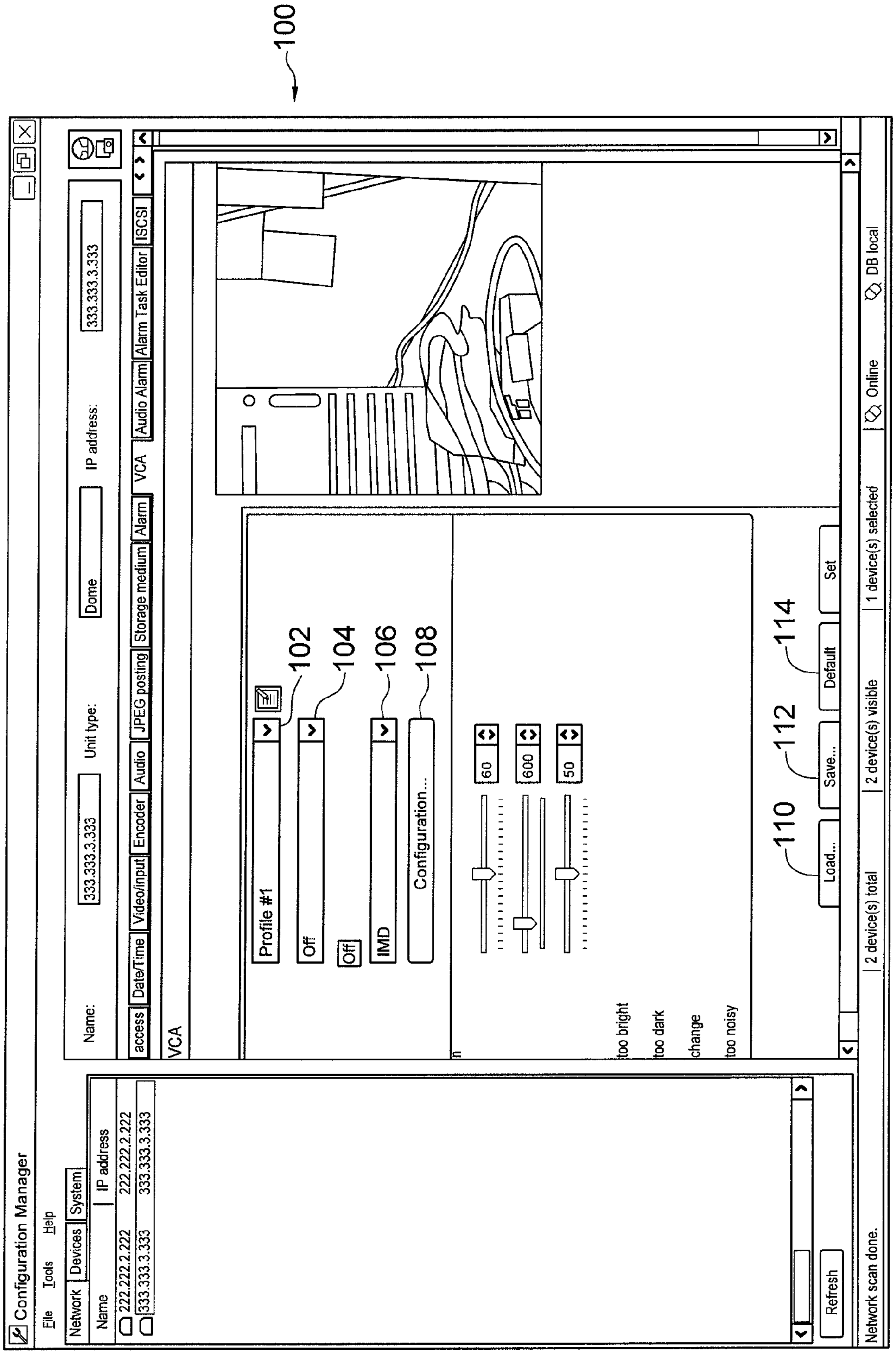
FIG. 6 shows an example configuration manager interface for accessing a camera system and associating a profile with a scene, according to an embodiment of the present invention.

FIG. 6 shows an interface for a configuration manager 70 used to configure video data processing. This interface may be accessed in a nonlimiting example by accessing a particular network address. As with the Web page interface 68 in FIG. 5, a "VCA" screen 100 is selected, as is "Profile #1" 102. Associated scene is set to "Off" 104 so that the profile selected is inactive, as a default choice. "IMD" 106 is chosen as the analysis type. A configuration button 108 is again present for configuring the profile. Load, save, and default buttons 110, 112, 114 are provided for loading, saving, or returning to a default configuration.

Figure 7:
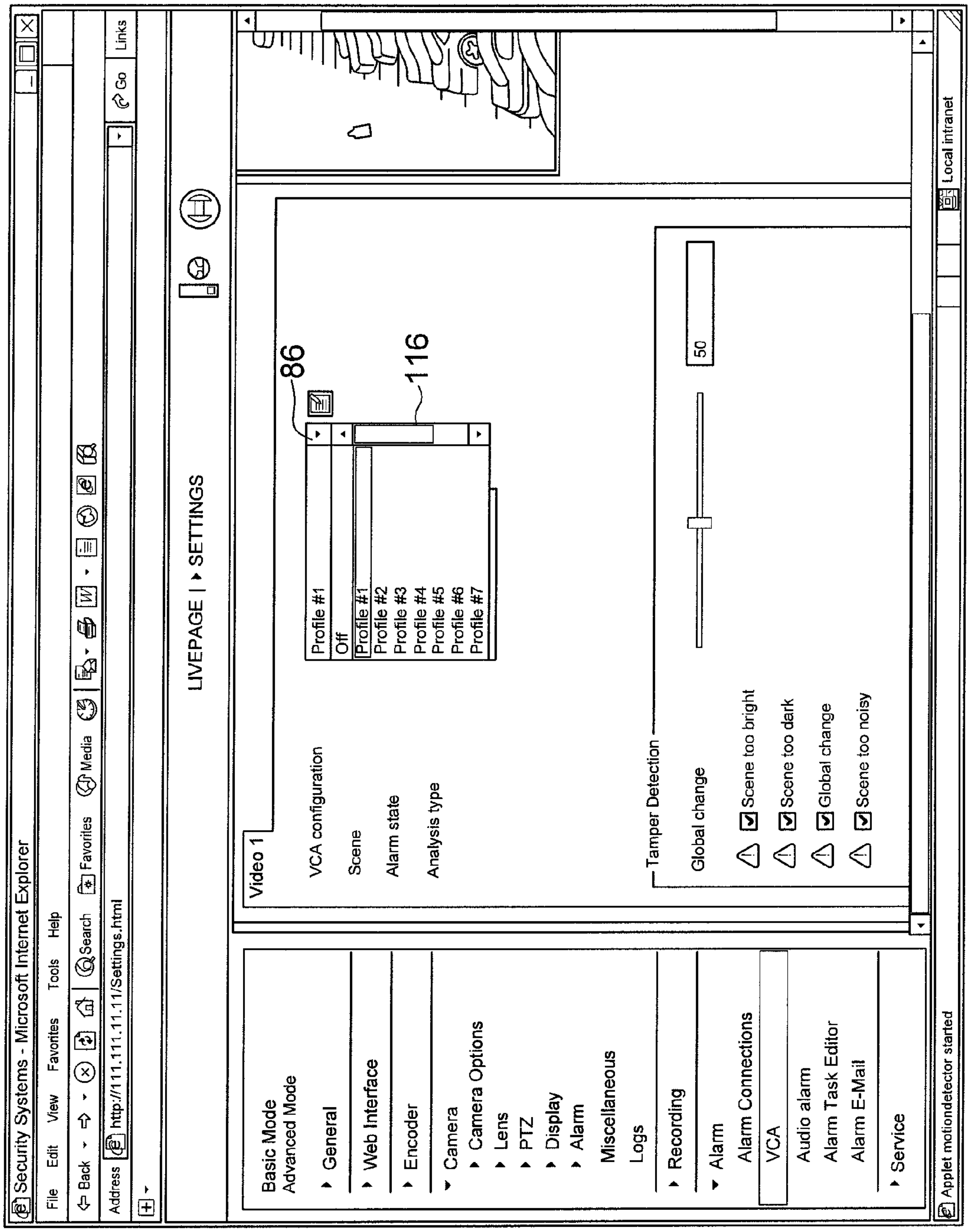
FIG. 7 shows a Web page interface including available profiles.
Figure 8:
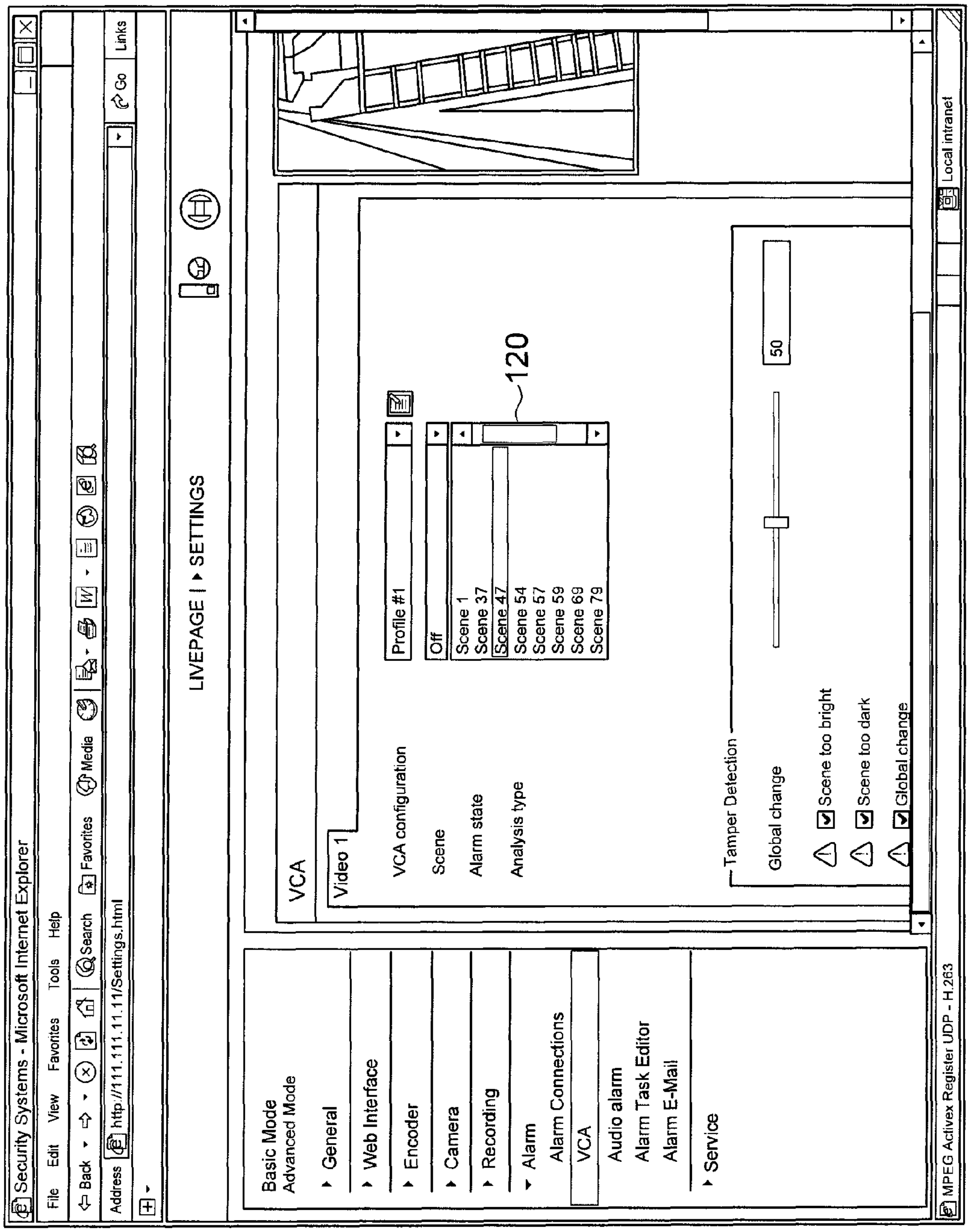
FIG. 8 shows a configuration Web page with available scenes for possible associating with a profile.

FIG. 7 shows available profiles for a PTZ camera, configured via the Web page interface 68. The drop-down menu 86 now shows an "off" option as well as options 116 for Profiles 1-10. Thus, in this nonlimiting example camera system up to ten profiles are available. Note that the scenes in FIG. 8 are defined a priori. Further, if a particular scene has a title, in an example embodiment this title may be shown instead of a number. Each profile in this example can be associated with one predefined scene. Further, for each scene, general motion detection options are available, as are tamper detection options.

Figure 9:
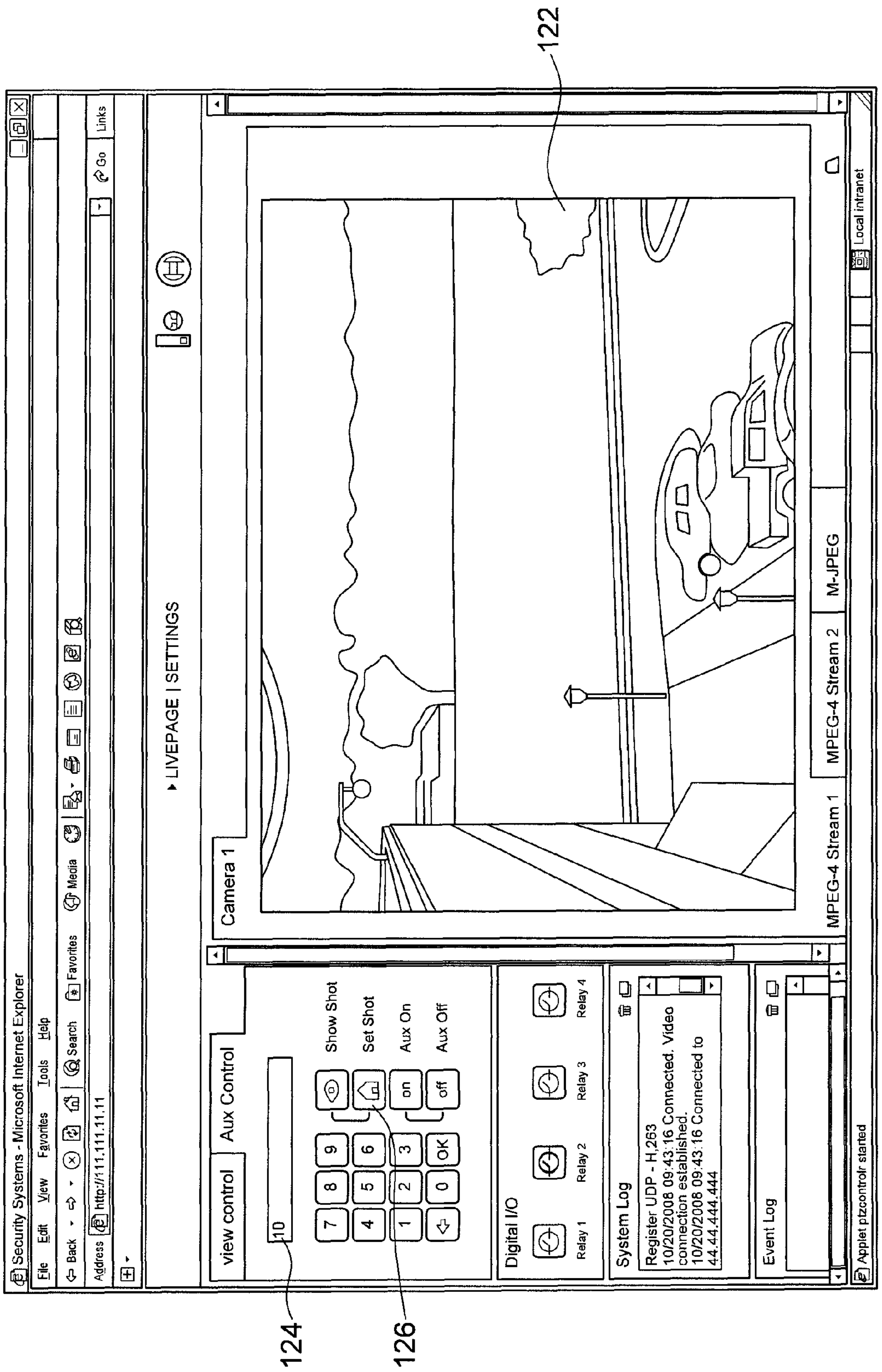
FIG. 9 shows an interface for saving a scene.

FIG. 8 shows a configuration page with available scenes 120, including Scene 1, Scene 37, Scene 47, etc. In this nonlimiting example camera system, up to ten scenes are defined in the range of 1 to 99 at desired locations. To save a scene, as shown in FIG. 9, once the PTZ camera 10 is navigated to the desired P, T, and Z positions (a view of which is shown in an appropriate window 122), a scene number 124 is entered into an auxiliary control tab, and a "set shot" button 126 is clicked. Other scenes may be saved in a similar manner.

Figure 10:
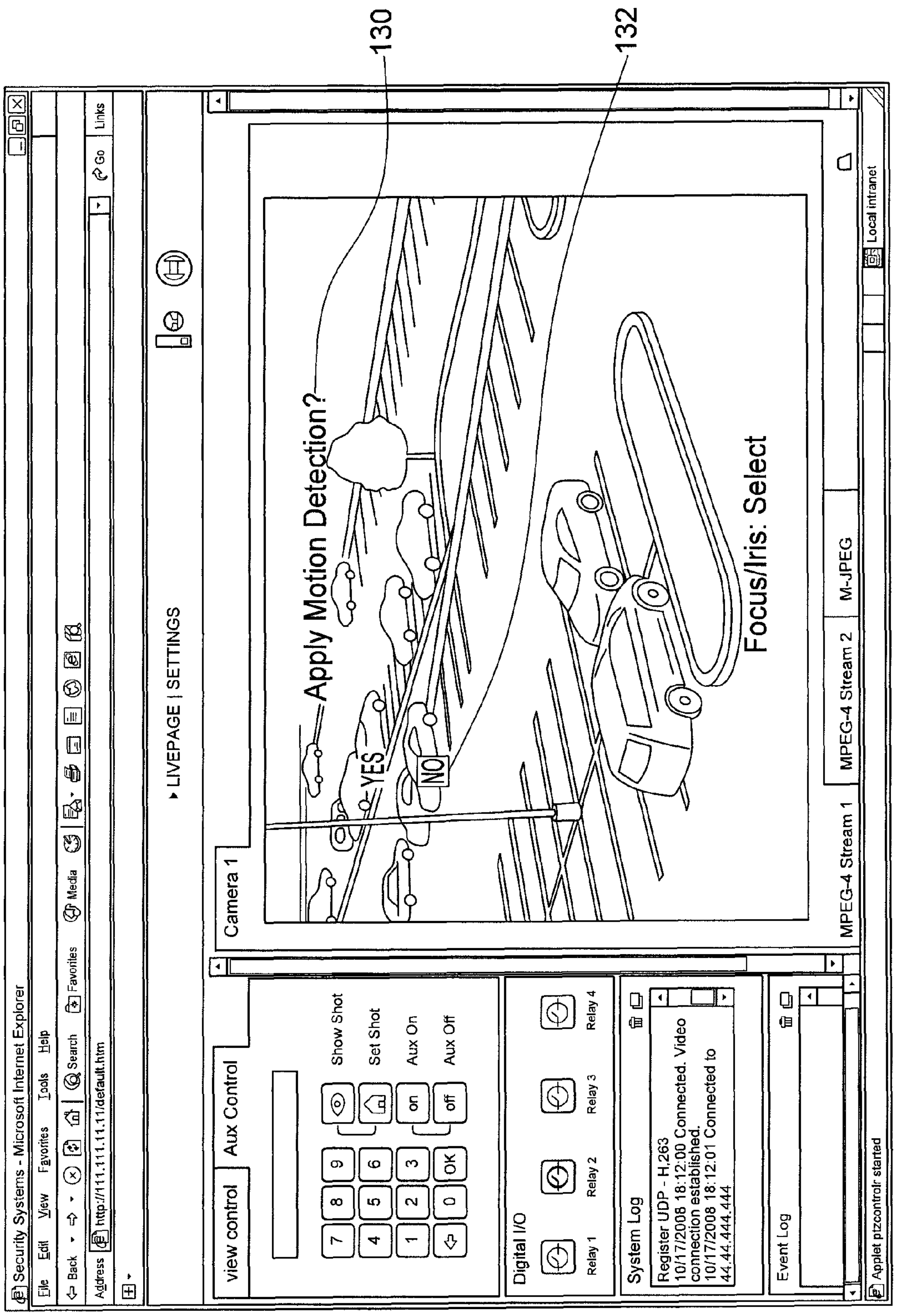
FIG. 10 shows an interface for applying analog motion detection to a saved scene.

With a scene saved, as shown in FIG. 10, an option 130 may be presented (in certain example embodiments) to apply a simple motion detection to the selected scene. Thus, in this example camera system, either simple motion detection or IMD video data processing can be selected. For example, by selecting "No" 132 to an "Apply Motion Detection?" question 130, a video data processing profile can then be associated with the selected scene. Simple motion detection, as opposed to task-based intelligent motion detection or other motion detection, refers to a motion detection method limited to detection of motion at one or more regions of interest. On the other hand, if simple motion detection is not available, this question is not asked. Note that even though a scene is selected for simple motion detection, a user may still be able to use a Web interface and assign the scene to a different monitoring configuration as well, including (but not limited to) IMD, optical flow techniques, or other motion detection. This association can overwrite a previous assignment (e.g., as a simple motion detection scene). In general, in an example embodiment, IMD or simple motion detection may be available for any scene.

Figure 11:
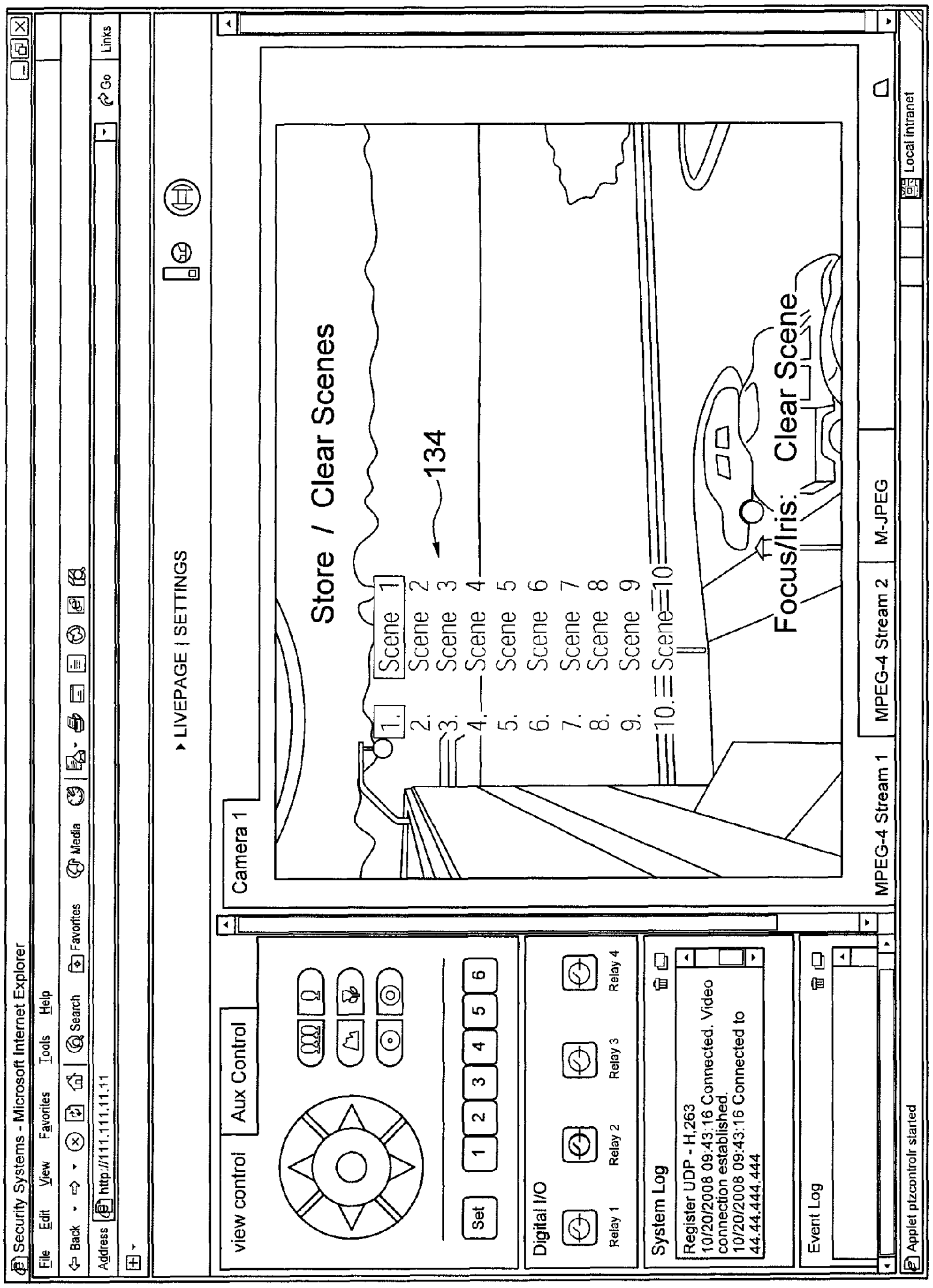
FIG. 11 shows an interface including a list of several defined scenes.
Figure 12:
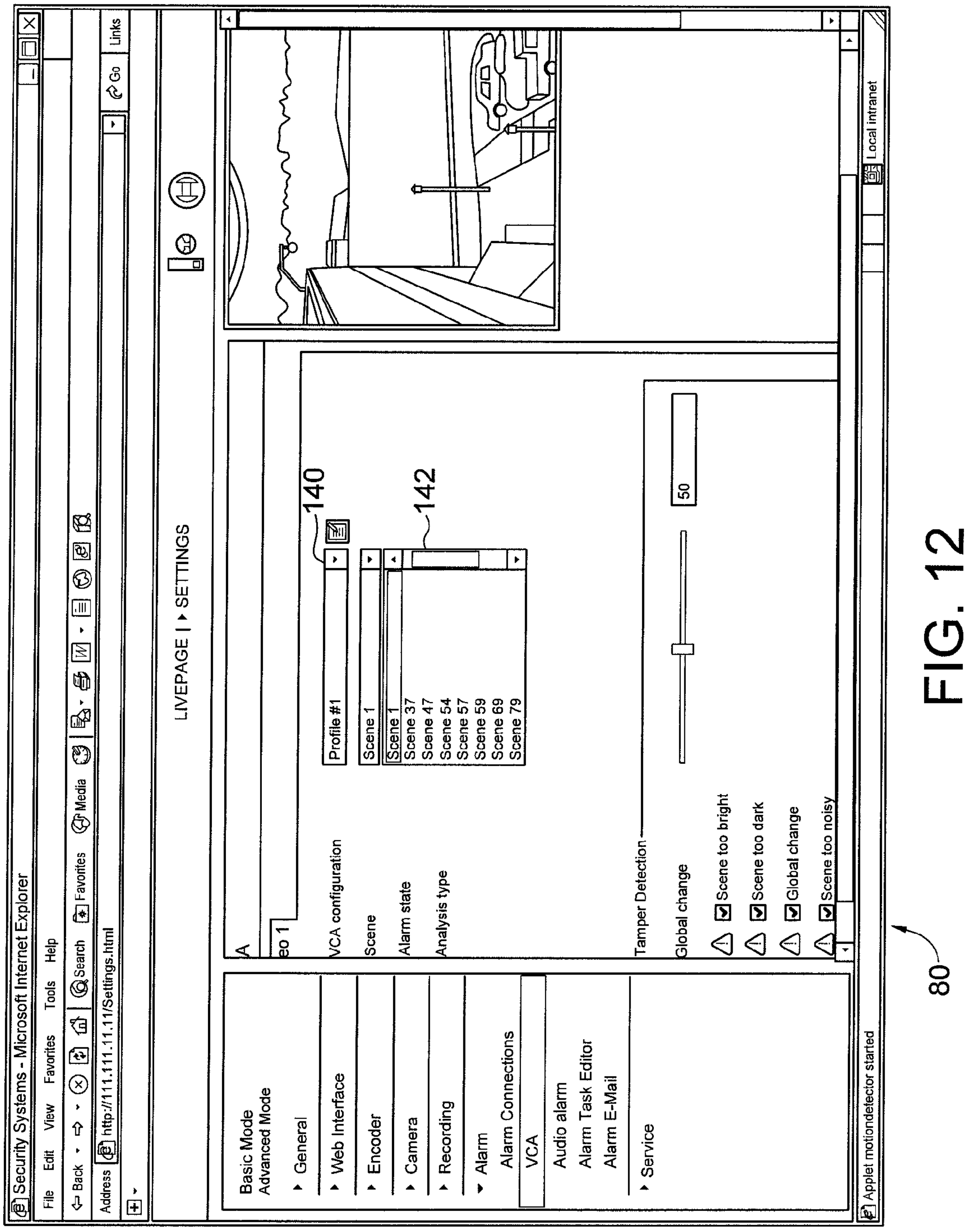
FIG. 12 shows an interface including a scene selection for associating the scene with a profile.
Figure 13:
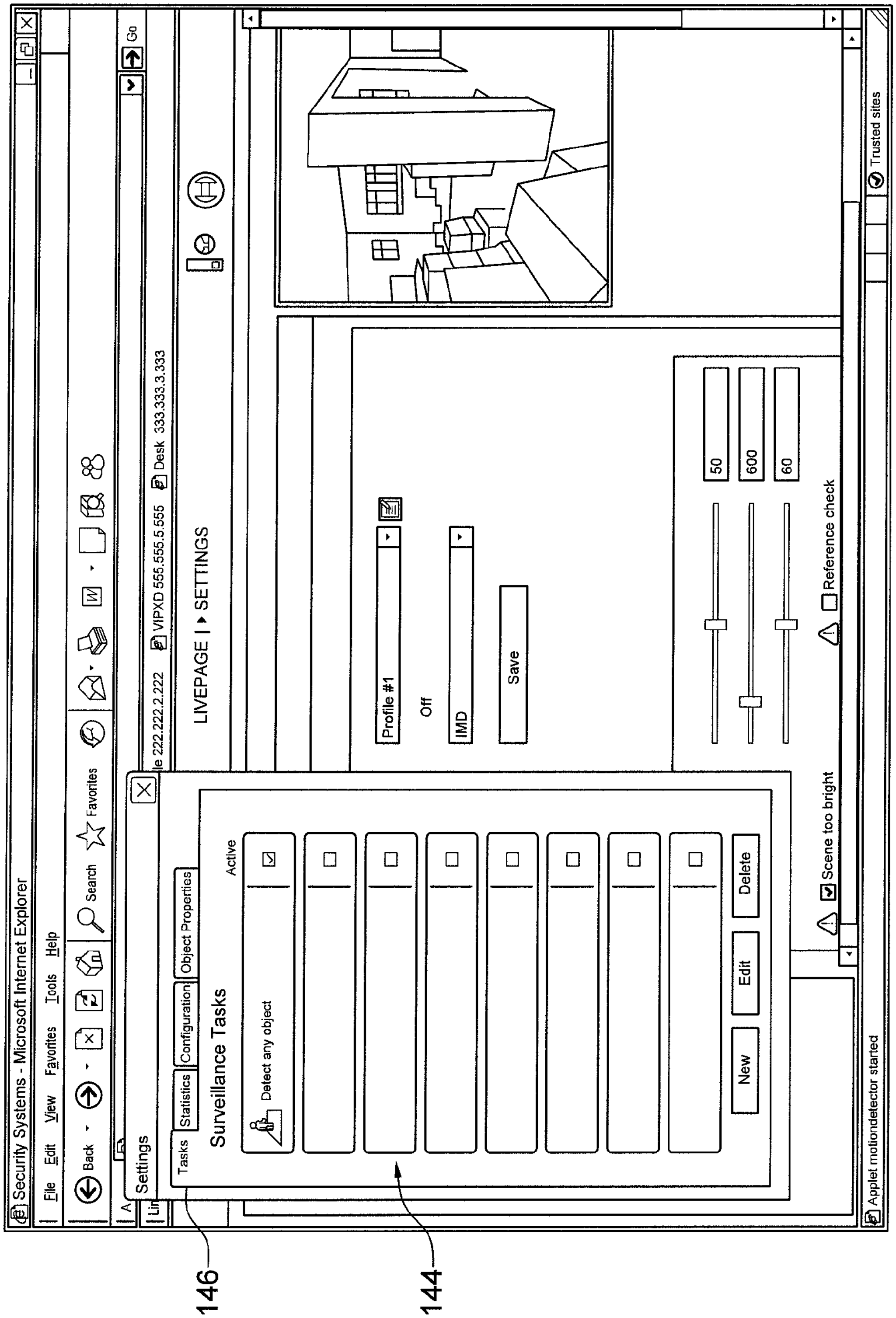
FIG. 13 shows an interface including a pane having options for configuring a particular profile, including object detection.
Figure 14:
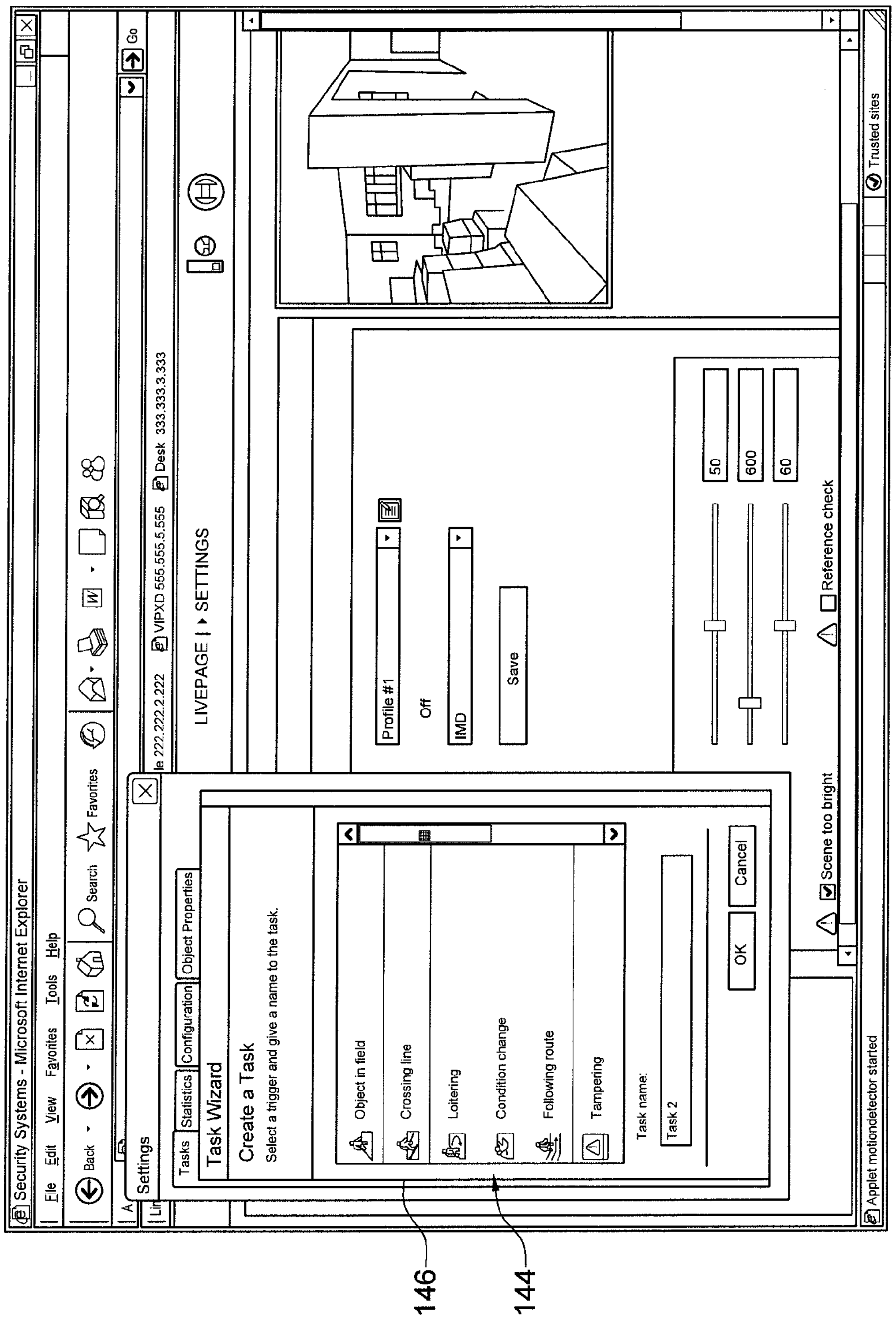
FIG. 14 shows an interface including a pane having options for configuring a particular profile, including options for creating a task.
Figure 15:
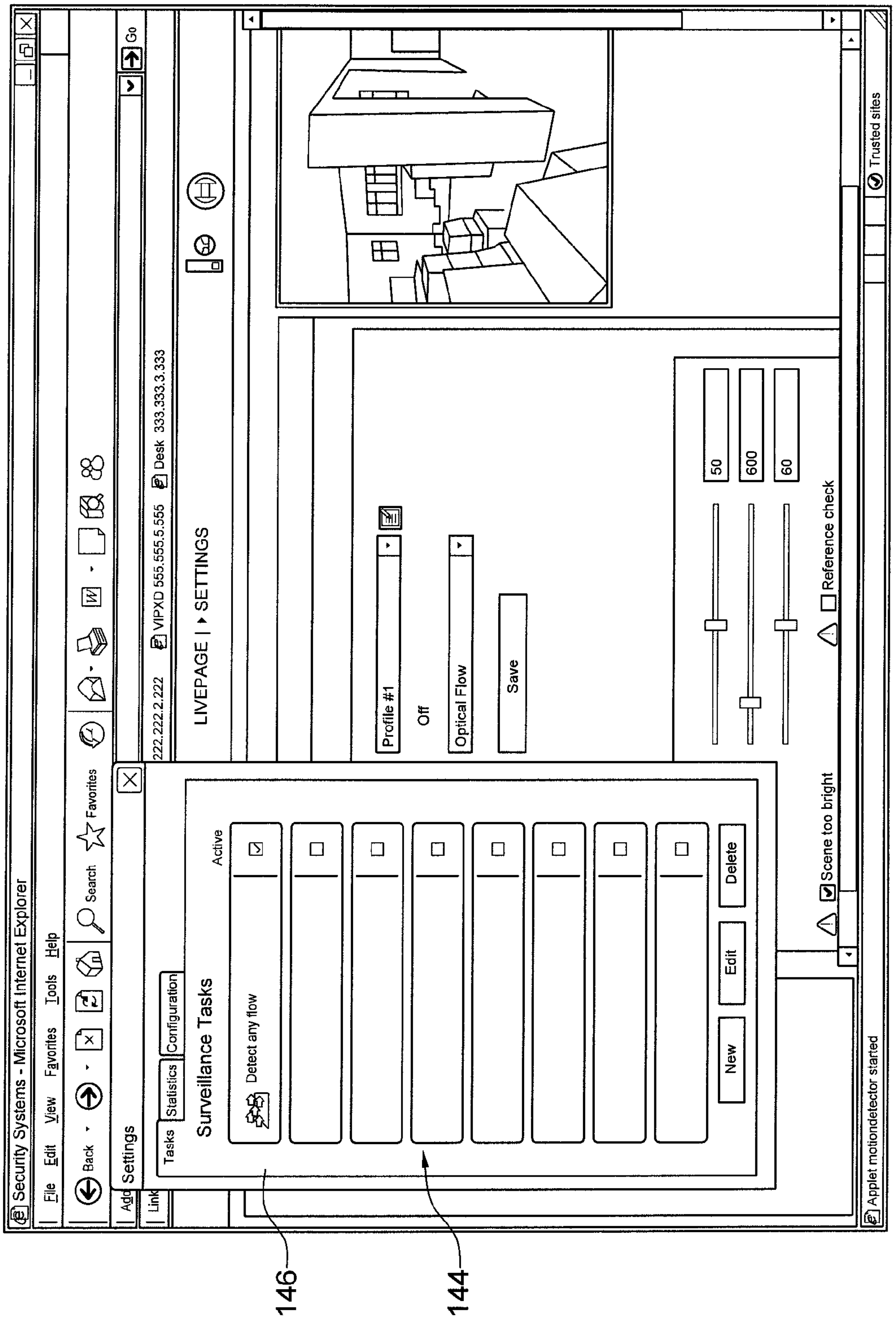
FIG. 15 shows an interface including a pane having options for configuring a particular profile, including an option for optical flow detection.

FIG. 11 shows a list 134 of all defined scenes in this example. To associate Profile 1 with Scene 1, as shown in FIG. 13, the Alarms-VCA page 80 is called, and the profile 140 (Profile 1) is selected. The scene is off by default, but the drop-down menu 142 shows the list of available scenes. Note that only the scenes that are not associated with any other profile are shown in the drop down menu 142 in this example. Scene 1 is selected, and the analysis type, e.g., IMD/simple motion detection, is also selected. For example, FIGS. 13-15 show a newly opened pane 144 including a number of options 146 for selecting analysis type. Once the scene is associated with the profile, the PTZ camera 10 may lock at the current scene for a period of time to complete the configuration. The configuration may be saved.

Figure 16:
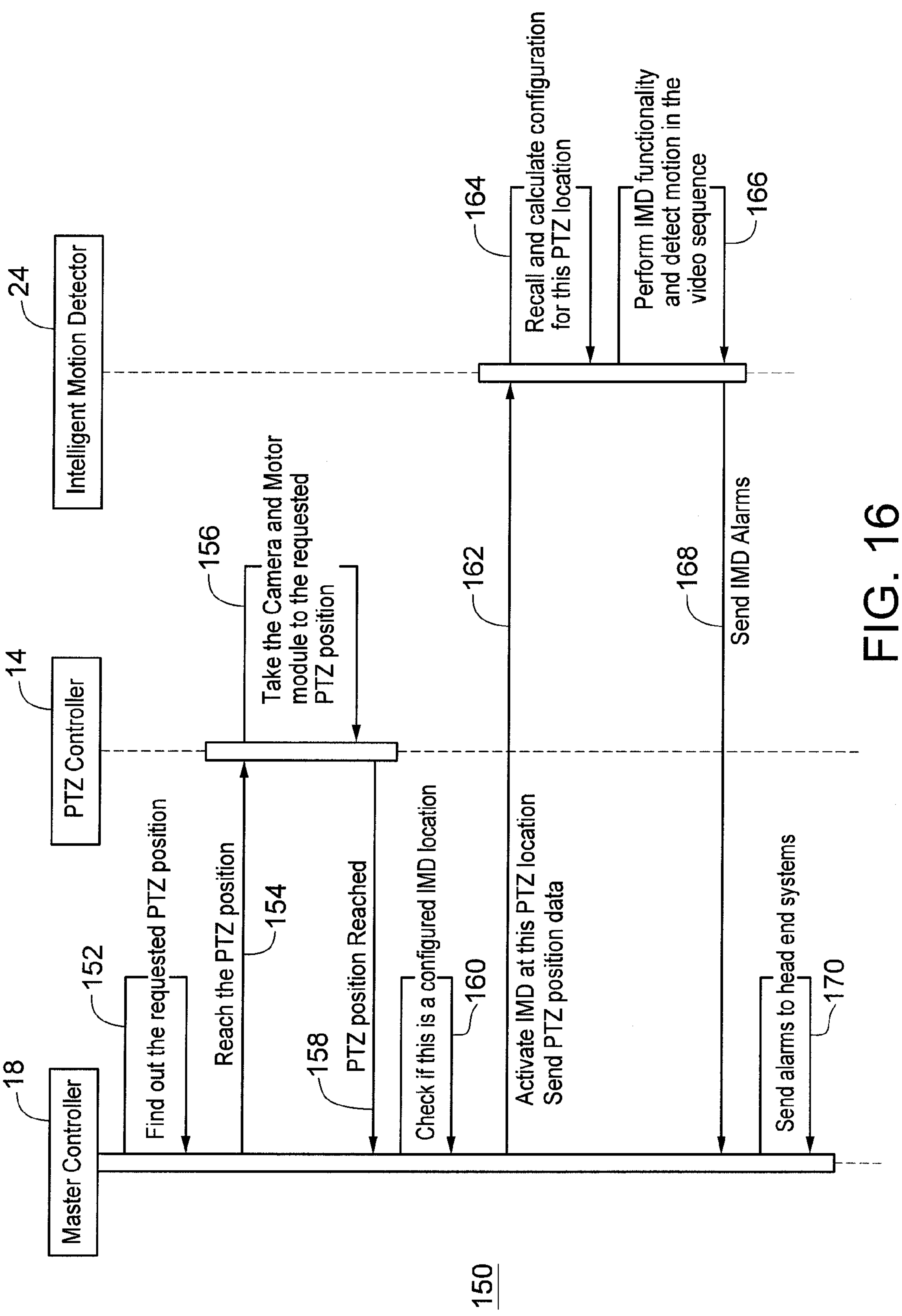
FIG. 16 shows an example method for monitoring using a stored configuration profile in an intelligent motion detector module, according to an embodiment of the present invention.

FIG. 16 shows an example monitoring process 150, including intelligent motion detection (IMD), for the PTZ camera 10. The master controller 18 elicits a requested PTZ position 152, which, as with the example configuration process in FIG. 2, can be a scene recall, part of a scene tour, or a PTZ position provided by other methods. The master controller 18 provides the PTZ position 154 to the PTZ controller 14, which controls the PTZ camera and motor module 12 to move the PTZ camera 10 to the requested PTZ position 156. In example embodiments, video data processing may be halted while the PTZ camera 10 is moving to reduce false alarm events. Upon activation, the video data processor, such as the IMD 24 and/or the master controller 18, may require a period of dwelling time, such as a few seconds, to start a video processing operation. In this case, if the PTZ camera 10 reaches a PTZ position that is associated with a video data processing profile, it should be sure that the PTZ camera stays at that position long enough for the video data processing to be fully functional.

Before, during, or after the PTZ position is reached 158, the master controller 18 checks to see if the particular PTZ position is associated with a profile 160; that is, whether the PTZ position is a configured video data processing (such as IMD) location. In an example embodiment, one profile (e.g., configuration) is associated with each position or scene, though more than one profile may be possible for a single position/scene if additional criteria, such as but not limited to temporal criteria, are part of the association (for example, a particular scene or position may have one associated profile during certain hours of the day, and another profile during other hours). As a nonlimiting example, two scenes may be defined by different characteristics (e.g., different numbers) at the same position. If the PTZ position is not associated with a profile, a global profile may be provided, in which case the video data processing (e.g., IMD) takes place according to the global profile. The global profile may be a configuration, including sensitivity masks, that applies to the entire 3D space in which the PTZ camera can move. In this case, the master controller 18 sends the PTZ position to the IMD module 24, which then recalls the stored configuration associated with the PTZ position (e.g., coordinates). The video data processing is then performed on the acquired video data using the stored configuration. As a nonlimiting example, the IMD module 24 processes the video data for a scene which has the sensitivity masks overlaid on the scene.

If, on the other hand, the PTZ position is associated with a profile, the master controller 18 activates the video data processing in the profile 162. For example, if the PTZ position is associated with a profile for IMD, then IMD is activated at this PTZ position. The PTZ position data is sent by the master controller 18 to the IMD module 24, which recalls and calculates the configuration for the particular PTZ position 164 according to the predetermined profile. The profile for the particular PTZ position may be a modification of the global profile or may be a separate profile, as described and shown herein.

Given the recalled and calculated configuration, the system processes the video data. For example, the IMD module 24 may perform IMD functionality and detect motion in the video sequence 166 provided by the camera 10 according to the recalled and calculated configuration. Nonlimiting examples of IMD functionality that may be embedded into the IMD module include loitering persons detection, removed objects detection, idle objects detection, objects within range detection, and tamper detection. Methods for performing such motion detection functionality using adjustable monitoring parameters will be understood by those of ordinary skill in the art. Again, it is desired that this IMD functionality take place within the movable camera 10, as shown in FIG. 1.

If, during the video data processing, an alarm condition is detected, the IMD module 24 sends the alarm information 168 (e.g., line crossing detection, global motion detection, route tracing detection, etc.) to the master controller 18. The master controller 18 may then take appropriate action. In a nonlimiting example, the master controller 18 may send alarms 170 to one or more external receiving devices 36 providing a head end system. The alarm may be configured according to an alarm rule engine if desired. The master controller 18, as described herein, may be linked to an Ethernet network and/or to the switchers and recorders 38, which can display the alarms on monitors 40, and also can allow recording of acquired and/or processed video data with higher resolutions. An indicator of an alarm condition may be inserted by software on the external device 36 to be combined with the displayed and/or recorded video. Recorded video may be searched using a suitable player, and in a forensic search, it may be possible to locate the alarms in the recorded video. In an example embodiment, any RCP client on the network who is registered for an alarm message may be able to detect and process the alarms. In another example, an email or other alert message may be sent (locally or via network, including Internet) if an alarm condition is detected.

If the video device moves away from the associated scene (e.g., by pan, tilt, zoom, focus, and/or iris movements), the IMD module is informed, and video analysis is changed according to another profile or turned off. Analysis associated with that particular scene starts again when the particular scene is recalled again.

Methods and apparatus for monitoring using a movable video device according to embodiments of the present invention have been shown and described herein. Example methods and systems allow a user to configure intelligent monitoring of a scene, such as intelligent motion detection, by associating particular monitoring parameters with that scene. These profiles may vary as will be appreciated by those of ordinary skill in the art. However, though a human user interacting with the camera system 10 has been shown and described in examples herein, it is also contemplated that configuration of video data processing algorithms may be performed automatically, such as in response to particular events.

As a nonlimiting example, a particular alarm condition when monitoring a particular scene may result in automatically reconfiguring the monitoring parameters for that scene by creating and/or modifying a new profile, and associating the new profile with that scene. In another example embodiment, an alarm condition changes an encoder profile. An encoder profile defines parameters (e.g., resolution, bit rate, etc.) for how video is streamed on a network. Various types of encoder profiles include low bandwidth profile, high quality profile, etc. In response to an event, such as an alarm event, the encoder profile can be changed. As a nonlimiting example, the video device can switch from a low resolution to a high resolution setting.

Additionally, in example embodiments, the video data is acquired and processed using embedded video devices and processors, respectively, within a camera system such as but not limited to a PTZ camera. Such video data processing may include automated and even intelligent video analysis, such as but not limited to intelligent motion detection, without requiring an external device (either directly linked or linked via network) to perform video data processing during normal operation. This feature allows, among other benefits, a modular approach to monitoring using the PTZ camera. Further, as movable video devices such as multiple PTZ cameras are mounted on a network and connected to switches and recorders, embodiments of the present invention allow using an existing alarm handling infrastructure. Particular example embodiments remove the need for any external analysis devices and software programs for performing the IMD.

Though certain example embodiments shown and described herein are directed to PTZ cameras, it is to be understood that other movable video devices may be used with embodiments of the present invention. As additional nonlimiting examples, video devices having pan only, tilt only, or zoom only (or combinations thereof) may be used. Additionally, though analog video inputs and/or paths have been shown, it is to be understood that digital video inputs and/or paths may be used as well, or any combination of analog and digital inputs and/or paths. Embodiments of the present invention are generally applicable to video devices for visible as well as non-visible light (e.g., a thermal or infrared camera).

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A method for monitoring using a movable video device, the video device including a video camera and being movable to a plurality of positions definable by three dimensions, the method comprising:

moving the video device to one of the plurality of positions, the one of the plurality of positions being defined by a first set of coordinates in three-dimensional space;

within the video device, acquiring video data from the video camera at the one of the plurality of positions;

determining if the one of the plurality of positions is associated with a predetermined profile by comparing the first set of coordinates with a second set of coordinates in three-dimensional space stored in a memory and associated with the predetermined profile, wherein the predetermined profile comprises at least one algorithm for monitoring at the one of the plurality of positions and one or more parameters for performing the at least one algorithm;

wherein the first set of coordinates and the second set of coordinates are independent of the acquired video data from the video camera, wherein if the first and second set of coordinates are the same then the one of the plurality of positions is determined to be associated with the predetermined profile, and said acquired video data is processed within the video device using a motion detection algorithm on said acquired video data, said motion detection algorithm being configured according to the predetermined profile; and sending a result of said processing to an external receiving device.

2. The method of claim 1, wherein:

the video device comprises a pan, tilt, and zoom (PTZ) camera, and the three dimensions include pan, tilt, and zoom.

3. The method of claim 1, wherein moving the video device comprises:

determining the first set of coordinates in 3D space; and controlling the video device to move to the one of the plurality of positions based on the first set of coordinates.

4. The method of claim 3, wherein said determining the first set of coordinates comprises receiving a selected scene associated with the first set of coordinates.

5. The method of claim 3, wherein said determining the first set of coordinates comprises generating a sequence of 3D positions including the first set of coordinates.

6. The method of claim 1, wherein said acquiring video data comprises acquiring an analog video stream.

7. The method of claim 1, wherein the profile comprises at least one motion detection algorithm.

8. The method of claim 1, wherein the profile is stored within the movable video device as one of a plurality of profiles.

9. The method of claim 1, further comprising:

based on said processing, determining if an alarm condition is met;

if the alarm condition is met, sending an alarm signal to the external device.

10. The method of claim 1, wherein said external device is linked via a network to the movable video device.

11. The method of claim 1, wherein the profile is associated with the one of the plurality of positions by an external configuring device.

12. The method of claim 11, wherein the external configuring device is linked to the movable video device by a network.

13. The method of claim 12, wherein the external configuring device is linked to the movable video device via internet protocol (IP).

14. The method of claim 1, further comprising:

associating a new profile with the one of the plurality of positions by receiving input from an external configuring device.

15. The method of claim 14, wherein said associating comprises:

directing the video device to the one of the plurality of positions;

saving the one of the plurality of positions;

receiving the input from the external configuration device to link the profile to said saved one of the plurality of positions.

16. The method of claim 15, wherein said received input is received via a configuration interface.

17. The method of claim 16, wherein said received input is received via a Web interface.

18. The method of claim 14, wherein said directing the video device comprises:

determining the first set of coordinates in 3D space;

controlling the video device to move to the one of the plurality of positions based on the first set of coordinates;

wherein said determining the first set of coordinates comprises at least one of receiving a selected scene associated with the first set of coordinates and generating a sequence of 3D positions including the first set of coordinates.

19. A monitoring system comprising:

a movable video device for acquiring video data, said video device including a video camera and being movable to a plurality of positions in three-dimensional space;

a controller for controlling said moving movable video device and moving said video device to one of the plurality of positions, the one of the plurality of positions being defined by a first set of coordinates in three-dimensional space; and a processor for processing the acquired video data acquired from the video camera and sending a result of the processing to an external device;

wherein said processor is configured to determine if the one of the plurality of positions is associated with a predetermined profile by comparing the first set of coordinates with a second set of coordinates in three-dimensional space stored in a memory and associated with the predetermined profile, and if the first and second set of coordinates are the same, process the acquired video data at the one of the plurality of positions according to the predetermined profile;

wherein the first set of coordinates and the second set of coordinates are independent of the acquired video data from the video camera;

wherein the predetermined profile comprises at least one motion detection algorithm for monitoring motion at the one of the plurality of positions and one or more parameters for performing the at least one motion detection algorithm; and a motion detection module provided within the video device for detecting motion at the one of the plurality of position associated with the predetermined profile using the motion detection algorithm on the video data acquired from the video camera.

20. The monitoring system of claim 19, wherein said controller comprises:

a first controller for determining the first set of coordinates in 3D space; and a second controller coupled to said first controller for controlling the video device to move to the one of the plurality of positions based on the first set of coordinates.

21. The monitoring system of claim 19, further comprising:

an external configuration device coupled to said processor for associating a new profile with the one of the plurality of positions.

22. The monitoring system of claim 19, wherein the predetermined profile is stored within said processor as one of a plurality of profiles.

23. The monitoring system of claim 19, further comprising:

an external receiving device for receiving the results of the processing.

24. The monitoring system of claim 23, wherein said processor is configured to determine if an alarm condition is met based on processing video data, and if the alarm condition is met, to send an alarm signal to the external device.

25. The monitoring system of claim 24, wherein said external receiving device is linked via a network to said processor.

26. The monitoring system of claim 25, further comprising:

an external configuration device coupled to said processor via a network for associating a new profile with the one of the plurality of positions.

27. The monitoring system of claim 26, wherein said external configuration device is linked to said processor via internet protocol (IP).

28. The monitoring system of claim 26, wherein said external configuration device comprises at least one of an input device and a software tool for associating the new profile with the one of the plurality of positions.

29. The monitoring system of claim 26, wherein said processor is configured to:

direct said video device to the one of the plurality of positions;

save the one of the plurality of positions; and receive an input from said external configuration device to link the new profile to said saved one of the plurality of positions.

30. The monitoring system of claim 26, wherein said external configuration device comprises a Web browser.

31. A processor configured to perform the method of claim 1.

32. A non-transitory machine readable medium containing executable instructions that, when executed, causes a processor to perform the method of claim 1.

33. The method of claim 14, wherein said associating comprises:

receiving, via the external configuration device, at least one selected monitoring algorithm and at least one selected parameter for performing the at least one selected monitoring algorithm;

creating an additional profile based on the received at least one selected monitoring algorithm and at least one selected parameter; and associating the created additional profile with the one of the plurality of positions.

* * * * *